(12) United States Patent
Gallagher et al.

(10) Patent No.: US 6,821,440 B2
(45) Date of Patent: Nov. 23, 2004

(54) TREATMENT OF MINERAL MATERIALS

(75) Inventors: Michael Gerard Gallagher, Corpus Christi, TX (US); Hal G. Smith, South Jordan, UT (US); Stephen Adkins, Cleckheaton (GB); Anne Frances Hooley, Wakefield (GB); Brian Dymond, Bradford (GB)

(73) Assignee: Ciba Specialty Chemicals Watertreatments Limited, Bradford (GB)

( * ) Notice: Subject to any disclaimer, the term of this patent is extended or adjusted under 35 U.S.C. 154(b) by 0 days.

(21) Appl. No.: 09/866,967

(22) Filed: May 29, 2001

(65) Prior Publication Data

US 2003/0010714 A1 Jan. 16, 2003

Related U.S. Application Data

(60) Provisional application No. 60/273,116, filed on Mar. 2, 2001, provisional application No. 60/273,117, filed on Mar. 2, 2001, and provisional application No. 60/208,161, filed on May 31, 2000.

(51) Int. Cl.$^7$ .............................................. C02F 11/14
(52) U.S. Cl. ....................... 210/732; 210/710; 210/730; 210/731; 210/734; 210/735; 210/738; 210/747; 423/121; 423/122; 405/128.75
(58) Field of Search ................................ 210/710, 723, 210/725, 727, 734, 747, 738, 732, 730, 731, 735, 728; 405/128.75; 423/121, 122

(56) References Cited

U.S. PATENT DOCUMENTS

| | | | | | |
|---|---|---|---|---|---|
| 3,977,971 | A | * | 8/1976 | Quinn et al. ................. | 210/732 |
| 4,274,958 | A | * | 6/1981 | Fitch .......................... | 210/208 |
| 4,720,346 | A | * | 1/1988 | Flesher et al. ........... | 162/168.2 |
| 4,777,200 | A | * | 10/1988 | Dymond et al. ............. | 524/458 |
| 5,043,077 | A | | 8/1991 | Chandler et al. ........... | 210/698 |
| 5,611,921 | A | * | 3/1997 | Deskins .................... | 210/195.1 |
| 5,696,228 | A | * | 12/1997 | Coville ........................ | 523/342 |
| 5,698,109 | A | * | 12/1997 | Payne et al. ................. | 210/727 |
| 5,725,779 | A | * | 3/1998 | Mallon et al. ............... | 210/728 |
| 5,728,295 | A | * | 3/1998 | Duan ....................... | 210/195.1 |
| 5,788,867 | A | * | 8/1998 | Pearson ...................... | 210/705 |
| 5,853,677 | A | * | 12/1998 | Avotins et al. ................ | 209/5 |
| 5,902,487 | A | * | 5/1999 | Pickering et al. ........... | 210/143 |

FOREIGN PATENT DOCUMENTS

| | | |
|---|---|---|
| EP | 0102760 | 3/1984 |
| EP | 0126528 | 11/1984 |
| EP | 0150933 | 8/1985 |
| EP | 0170394 | 2/1986 |
| EP | 0202780 | 11/1989 |
| EP | 0388108 | 9/1990 |
| WO | 96/05146 | 2/1996 |
| WO | 98/29604 | 7/1998 |
| WO | 98/31748 | 7/1998 |
| WO | 98/31749 | 7/1998 |

\* cited by examiner

Primary Examiner—Peter A. Hruskoci
(74) Attorney, Agent, or Firm—Tyler A. Stevenson

(57) ABSTRACT

A process in which material comprising an aqueous liquid with dispersed particulate solids is pumped as a fluid then allowed to stand and rigidify and the rigidification is improved whilst retaining the pump ability of the material by combining polymeric particles with the material during or prior to pumping the material, wherein the polymeric particles comprise water soluble polymer which has an intrinsic viscosity of at least 3 dl/g. The process of the invention more effectively minimises the area taken up by a stack of the material of given volume whilst maintaining the pumpability of the material. This invention is particularly suited to material that comprises red mud from the Bayer alumina process.

10 Claims, 2 Drawing Sheets

TREATMENT OF MINERAL MATERIALS

This application claims the benefit under 35 U.S.C. 119(e) of U.S. Provisional Applications Nos. 60/208,161, 60/273,116 and 60/273,117, Filed May 31, 2000, Mar. 2, 2001 and Mar. 2, 2001 respectively.

The present invention relates to the treatment of mineral material, especially waste from the Bayer alumina process, including the treatment of red mud wastes in order to render it more easily disposable.

Processes of treating mineral ores in order to extract mineral values will normally result in waste material. Often the waste material consists of an aqueous slurry or sludge comprising particulate mineral material, for instance clays, sand, grit, metal oxides etc. It is normally necessary to dewater the waste slurries or sludges before disposal in a suitable location.

In some cases the waste material such as mine tailings can be conveniently disposed of in a mine to form a backfill. Generally backfill waste comprises a high proportion of coarse large sized particles together with other smaller sized particles and is pumped into the mine a slurry where it is allowed to dewater leaving the sedimented solids in place. It is common practice to use flocculants to assist this flocculation process.

For other applications it may not be possible to dispose of the waste in a pit or a mine. In these instances the waste material may be transferred to lagoons, heaps or stacks. There is a great deal of environmental pressure to minimise the allocation of new land for disposal purposes and to more effectively use the existing waste areas. One way is to load multiple layers of waste onto an area to thus form higher stacks of waste. However, this presents a difficulty of ensuring that the waste material can flow over the surface of previously rigidified waste within acceptable boundaries and allowed to rigidify to form a stack and that the waste is sufficiently consolidated to support multiple layers of rigidified material, without the risk of collapse or slip. Thus the requirements for providing a waste material with the right sort of characteristics for stacking is altogether different from those required for other forms of disposal, such as back-filling.

In the Bayer process for recovery of alumina from bauxite, the bauxite is digested in an aqueous alkaline liquor to form sodium aluminate which is separated from the insoluble residue. This residue consists mainly of particles of ferric oxide and is known as red mud.

The red mud is washed in a plurality of sequential wash stages, in which the red mud is contacted with a wash liquor and is then flocculated by addition of a flocculating agent. The supernatent liquor is further processed to recover aluminate. After the final wash stage the red mud slurry is thickened as much as possible and then disposed of. Thickening in the context of this specification means that the solids content of the red mud is increased. The final thickener may comprise settlement of flocculated slurry only, or sometimes, includes a filtration step. Alternatively or additionally the mud may be subjected to prolonged settlement in a lagoon.

The mud can be disposed of and/or subjected to further drying for subsequent disposal on a mud stacking area. To be suitable for mud stacking the mud should have a high solids content and, when stacked, should not flow but should be relatively rigid in order that the stacking angle should be as high as possible so that the stack takes up as little area as possible for a given volume. The requirement for high solids content conflicts with the requirement for the material to remain pumpable as a fluid, so that even though it may be possible to produce a mud having the desired high solids content for stacking, this may render the mud unpumpable.

EP-A-388108 describes adding a water-absorbent, water-insoluble polymer an aqueous liquid to a material comprising an aqueous liquid with dispersed particulate solids, such as red mud, prior to pumping and then pumping the material, allowing the material to stand and then allowing it to rigidify and become a stackable solid. The polymer absorbs the aqueous liquid of the slurry which aids the binding of the particulate solids and thus solidification of the material. However this process has the disadvantage that it requires high doses of absorbent polymer in order to achieve adequate solidification. In order to achieve a sufficiently rigidified material it is often necessary to use doses as high as 10 to 20 kilograms per tonne of mud. Although the use of water swellable absorbent polymer to rigidify the material may appear to give an apparent increase in solids, the aqueous liquid is in fact held within the absorbent polymer. This presents the disadvantage that as the aqueous liquid has not actually been removed from the rigidified material and under certain conditions the aqueous liquid could be, desorbed subsequently and this could risk re-fluidisation of the waste material, with the inevitable risk of destabilising the stack.

Thus there exists a need to provide a process that more effectively and conveniently allows a material to be pumped readily as a fluid and which on standing will rigidify to provide a stackable solid waste. There also exists a need to achieve this by substantially reducing the amount of aqueous liquid contained in the material.

A process according to the present invention provides a process in which material comprising an aqueous liquid with dispersed particulate solids is pumped as a fluid then allowed to stand and rigidify and the rigidification is improved whilst retaining the pumpability of the material by combining polymeric particles with the material during or prior to pumping the material,
wherein the polymeric particles comprise water soluble polymer which has an intrinsic viscosity of at least 3 d/g.

The addition of the polymeric particles, comprising water soluble polymer to the material enables the material to retain its fluidity and to be easily pumped but upon standing forms a solid mass that is strong enough to support layers of subsequent rigidified material. We have surprisingly found that the presence of water soluble polymers applied in the form of particles actually enables the material to remain fluid and pumpable during the pumping stage but results in rapid loss of fluidity and rigidification on standing. Furthermore this treatment desirably results in aqueous liquid being released from the material on standing. It appears that application of the particulate water soluble polymer to the material results in a gradual increase in viscosity but not so significantly that would prevent the material from being pumped. It is also surprising that the addition of the water soluble polymer does not result in more immediate dewatering of the material prior to the location for disposal, which could result in blockage of the pipe-line.

Suitable doses of polymer range from 10 g to 10,000 grams per tonne of material solids. Generally the appropriate dose can vary according to the particular material and material solids content. Preferred doses are in the range 100 to 3,000 grams per tonne.

The process of the invention is suitable for treating material wherein the dispersed particulate solids have very small particle sizes, for instance, substantially all having sizes less than 100 microns, and even for materials wherein substantially all of the particles have sizes of less than 50 microns. It is of particular value where at least 90% of the particles have sizes less than 20 microns, especially where the proportion of liquor in the waste stream cannot be easily or economically reduced.

The material particles are usually inorganic and/or usually a mineral. Although it may be useful for other materials requiring to be pumped and then stacked especially for materials which are filter cakes, tailings, thickener underflows, or unthickened plant waste streams, for instance other mineral tailings or slimes, including phosphate, diamond, gold slimes, tails from copper/silver/uranium ore processing, coal or iron ore, the major use of the present process is in the treatment of the final thickener or wash stage of a Bayer process. The red mud may thus be the solids settled from the final thickener or wash stage by the addition of flocculant alone, or, optionally, the material is the filter cake from filtration (e.g. pressure filtration or vacuum filtration etc.) of the slurry produced in the final wash stage.

The red mud or other material which is pumped may have a solids content in the range 15% to 80% by weight. The red mud slurries are often in the range 20% or 30% to 70% by weight, for instance 45% to 65% by weight. The sizes of particles in a typical red mud sample are substantially all less than 25 microns, for instance about 95% by weight of mud is particles less than 20 microns and about 75% is less than 10 microns, and about 95% by weight of mud is particles less than 20 microns and about 75% is less than 10 microns, and about 95% more than 3 microns.

We have found better results are obtained when the material is relatively concentrated and homogenous. It may also be desirable to combine the addition of the polymeric particles with other additives. For instance the flow properties of the material through a conduit may be facilitated by including a dispersant. Typically where a dispersant is included it would be included in conventional amounts. However, we have found that surprisingly the presence of dispersants or other additives does not impair the rigidification of the material on standing.

Thus in the present invention the polymeric particles are added directly the aforementioned material. The polymeric particles may consist wholly or partially of water-soluble polymer. Thus the particulate polymer may comprise a blend of cross-linked water swellable water-insoluble polymer and water soluble polymer. This may be a physical blend of swellable polymer and soluble polymer or alternatively is a lightly cross-linked polymer for instance as described in EP-202780. Although the polymeric particles may comprise some cross-linked polymer it is essential to the present invention that a significant amount of water soluble polymer is present. When the polymeric particles comprise some swellable polymer it is desirable that at least 80% of the polymer is water-soluble. Preferably the polymeric particles are wholly or at least substantially water soluble. The water soluble polymer may be branched by the presence of branching agent, for instance as described in WO-A-9829604, for instance in claim 12, or alternatively the water soluble polymer is substantially linear.

Preferably the water soluble polymer is of moderate to high molecular weight. Desirably it will have an intrinsic viscosity of at least 3 dl/g and generally at least 5 or 6 dl/g, although the polymer may be of significantly high molecular weight and exhibit an intrinsic viscosity of 25 dl/g or 30 dl/g or even higher. Preferably the polymer will have an intrinsic viscosity in the range of 8 dl/g to 20 dl/g, more preferably 11 dl/g or 12 dl/g to 16 dl/g or 17 dl/g.

The water soluble polymer may be a natural polymer, for instance polysaccharides such as starch or dextran or a semi-natural polymer such as carboxymethyl cellulose or hydroxyethyl cellulose. Preferably the polymer is synthetic and preferably it is formed from ethylenically unsaturated water-soluble monomer or blend of monomers.

The water soluble polymer may be cationic, nonionic, amphoteric, but preferably is anionic. Particularly preferred anionic polymers are formed from monomers selected from ethylenically unsaturated carboxylic acid and sulphonic acid monomers, preferably selected from (meth)acrylic acid, allyl sulphonic acid and 2-acrylamido-2-methyl propane sulphonic acid, optionally in combination with nonionic comonomers, preferably selected from (meth)acrylamide, hydroxy alkyl esters of (meth)acrylic acid and N-vinyl pyrrolidone.

In the invention the water soluble polymer may be formed by any suitable polymerisation process. The polymers may be prepared for instance as gel polymers by solution polymerisation, water-in-oil suspension polymerisation or by water-in-oil emulsion polymerisation. When preparing gel polymers by solution polymerisation the initiators are generally introduced into the monomer solution. Optionally a thermal initiator system may be included. Typically a thermal initiator would include any suitable initiator compound that releases radicals at an elevated temperature, for instance azo compounds, such as azobisisobutyronitrile. The temperature during polymerisation should rise to at least 70° C. but preferably below 95° C. Alternatively polymerisation may be effected by irradiation (ultra violet light, microwave energy, heat etc.) optionally also using suitable radiation initiators. Once the polymerisation is complete and the polymer gel has been allowed to cool sufficiently the gel can be processed in a standard way by first comminuting the gel into smaller pieces, drying to the substantially dehydrated polymer followed by grinding to a powder. Alternatively polymer gels may be supplied in the form of polymer gels, for instance as neutron type gel polymer logs. Such polymer gels may be prepared by suitable polymerisation techniques as described above, for instance by irradiation. The gels may be chopped to an appropriate size as required and then on application mixed with the material as partially hydrated water soluble polymer particles.

The polymers may be produced as beads by suspension polymerisation or as a water-in-oil emulsion or dispersion by water-in-oil emulsion polymerisation, for example according to a process defined by EP-A-1 50933, EP-A-1 02760 or EP-A-126528.

Alternatively the water soluble polymer particles may be provided as a dispersion in an aqueous medium. This may for instance be a dispersion of polymer particles of at least 20 microns in an aqueous medium containing an equilibriating agent as given in EP-A-170394. This may for example also include aqueous dispersions of polymer particles prepared by the polymerisation of aqueous monomers in the presence of an aqueous medium containing dissolved low IV polymers such as poly diallyl dimethyl ammonium chloride and optionally other dissolved materials for instance electrolyte and/or multihydroxy compounds e.g. polyalkylene glycols, as given in WO-A-9831749 or WO-A-9831748.

In one form of the invention the polymer particles may be added to the material (e.g. red mud) in the form of water soluble polymer particles in an aqueous dispersion.

In a particularly preferred form of the invention the polymer particles are in the form of an aqueous dispersion, for example as described in our patent application (Case number MP/W-22308/P1/AC 557). In this aspect the aqueous dispersion is comprised of (a) a liquid dispersing medium consisting mainly of salt solution which comprises at least 25% by weight of inorganic salt based on total weight of dispersing medium; and (b) a water-soluble vinyl addition non-ionic or anionic polymer, and that is substantially insoluble in said salt solution, wherein said polymer is formed from ethylenically unsaturated monomers consisting of acrylic acid (or salts), optionally (meth)acrylamide and optionally at least one cross-linking monomer containing at least two polymerisable ethylenically unsaturated groups and wherein the inorganic salt comprises a Group II metal halide.

In this form of the invention the liquid dispersing medium should consist mainly of dissolved inorganic salt and although minor amounts of other materials may be tolerated, they are not necessary to perform the invention. Furthermore materials which serve to increase the viscosity of the dispersing medium may be disadvantageous, if the viscosity is increased to such an extent that it prevents the dispersion from flowing or being pumped.

The salt solution may contain other dissolved salts, but should contain sufficient Group II metal halide in order to prevent the polymer from dissolving. Salt solutions made entirely of Group I metal salts, for instance sodium chloride or potassium iodide do not prevent the polymer from hydrating. Even saturated solutions of such salts do not provide an acceptable dispersion of polymer. Thus where other inorganic metal salts are present in the salt solution it is essential that the major salt component should be Group II metal halide. Preferably the dispersing medium consists only of inorganic salt, which is entirely the Group II metal halide, since this provides suitable dispersion wherein the polymer remains substantially unhydrated indefinitely or at least for prolonged periods of time, which makes storage possible. The polymer may become partially hydrated and partially swell as long at the polymer particles remain discrete and dispersible. Preferably the polymer particles remain unhydrated and unswollen to any significant degree. When the dispersion is not stirred or agitated the polymer particles will tend to settle. However, surprisingly the particles do not substantially hydrate or form agglomerates and so can easily be redispersed to form the dispersion.

Preferably the Group II metal salt halide is a halide of Berylium, Magnesium, Calcium and Strontium, since these appear to provide best results in reducing or preventing the hydration of the polymers in the dispersion.

Suitable results are obtained when the halide of the Group II metal halide is Fluoride, Chloride or Bromide.

It is possible to use a mixture of different Group II metal halides, although it is normally sufficient for one of the salts to be present.

Improved results are obtained when the aqueous dispersion comprises dispersing medium which is an aqueous salt solution of at least one of the following Group II metal halides: Magnesium Chloride, Magnesium Bromide, Calcium Chloride or Calcium Bromide. Best results are obtained when the inorganic salt is calcium chloride.

Generally the dispersing medium of the aqueous dispersion will contain high concentrations of the Group II metal halide. The salt concentration in the dispersing medium must be at least 25% by weight and therefore the choice of the salt will then depend on the solubility of the salt. Preferred results are obtained when the salt concentration is at least 30% by weight and usually at least 35%. Better results have been observed when the salt concentration is at least 36% by weight. More preferably still we find very much improved results are obtained when the inorganic salt is present in an amount of 39 to 45% by weight.

We have found that surprisingly the dispersion may contain relatively high quantities of polymer, for instance at least 30% by weight of said polymer per volume of dispersing medium. Usually the amounts of polymer contained in the dispersions are much higher still. For instance the aqueous dispersion may comprise between 40 and 60% by weight of said polymer per volume of dispersing medium.

In one preferred form of the invention we provide an aqueous dispersion having a bulk viscosity of about less than 10 cps when measured at a pH of 7.0 at 25° C., comprised of (a) a dispersing medium which consists of a salt solution comprised of from about 35% to about 45% by weight based of total weight of dispersing medium of inorganic salt, selected from the group consisting of calcium chloride, calcium bromide, magnesium chloride and magnesium bromide; and (b) at least 30% by weight of a nonionic or anionic water-soluble or water swellable vinyl-addition polymer per volume of dispersing medium, wherein said polymer is formed from ethylenically unsaturated monomers consisting of acrylic acid (or salts) and/or (meth)acrylamide and optionally at least one cross-linking monomer containing at least two polymerisable ethylenically unsaturated groups.

The polymeric particles used in this aspect of the invention may be prepared by any convenient route. The polymer particles may have been prepared as dry free flowing particles. For instance they may have been prepared as an aqueous gel which is dried and ground to the appropriate particle size or as beads using a reverse phase suspension polymerisation. Alternatively the polymer particles may have been prepared by a reverse phase emulsion polymerisation, optionally followed by vacuum distillation to partially dehydrate the dispersed phase polymer particles. The particles may then be separated from the continuous oil phase by conventional techniques and then redispersed into the aqueous dispersion medium.

Generally the viscosity of the dispersion will be lower than 10, for instance as low as 5 cps or lower. In some cases the viscosity may be as low as 1 or 2 cps or lower.

Thus the aqueous dispersion of polymer may be prepared by the steps, (a) forming a liquid dispersing material which consists of aqueous salt solution comprising at least 25% inorganic salt which comprises a Group II metal halide;

(b) combining the dispersing medium a water-soluble or water swellable vinyl addition non-ionic or anionic polymer, and that is insoluble, wherein said polymer is formed from ethylenically unsaturated monomers consisting of acrylic acid (or salts), optionally (meth)acrylamide and optionally at least one cross-linking monomer containing at least two polymerisable groups to form a mixture of polymer and dispersing medium, wherein the dispersing medium is agitated during and/or after forming the mixture in order to form the dispersion.

Generally the dispersing medium will be agitated and the polymer particles are fed into the medium, for instance by a screw feeder. The particles can also be poured in or blown into the medium. Often the medium will be in a stirred tank and the polymer is fed into the stirred medium. The agitated medium may also be the liquid flowing down a conduit, into which the polymer is fed.

Alternatively the polymer can be fed into the dispersing medium which is substantially not agitated. For instance the polymer can be allowed to settle in the dispersing medium and then the dispersion can be formed by subsequent agitation, for instance by stirring or flowing along a pipe.

The aqueous dispersion of polymer particles in the salt solution dispersing medium comprising the Group II metal halide may be incorporated into the material in any convenient way. For instance the dispersion can be pumped directly into a conduit through which the material is flowing. Alternatively the aqueous dispersion may be incorporated into the a final sedimentation state prior to conveying the underflow of material along a conduit. Either of these methods are suitable for instance when the material is red mud from the Bayer Alumina process.

In another form of the invention the polymeric particles added to the material have an average particle size of less than 10 microns. The polymer particles may be added in the form of a reverse phase emulsion, comprising a dispersed phase of water soluble polymer dispersed throughout a water immiscible liquid. Alternatively the particles may be added in the form of a reverse phase dispersion, that has been prepared by dehydrating reverse phase emulsion under reduced pressure to remove most of the water from the dispersed phase. The reverse phase dispersions or emulsions often comprise polymer particles of particle size at least 90% below 2 microns, usually below 1 micron for instance may have an average particle size in the range 500 nanometers to 750 nanometers. The polymer particles may also be added in the form of a microemulsion, in which the average particle size may be below 200 nanometers, for instance 50 to 100 nanometers.

Thus in this aspect the reverse phase emulsion or dispersion can be pumped directly into a flow line conveying the material, for instance in the same manner as the first aspect of the invention. It may be desirable to add an activator simultaneously with the reverse phase emulsion or dispersion. The activator may be any conventional activator normally used to activate reverse phase emulsions and dispersions. The activator may be added in any suitable amount, typically between 1 and 5% by weight of the emulsion, for instance between 2 and 4%.

Alternatively the polymer particles may be agglomerates or aggregates of primary particles which have an average particle size of below 10 microns and wherein the aggregates have a particle size of greater than 20 microns. Thus the particles may exist as bonded friable aggregates of which at least 90% by weight have a size of more than 50 microns. On addition to the aqueous material the aggregates break down into the primary particles.

In the process of the invention the polymeric particles are preferably added to the material as substantially individual particles of particle size greater than 20 microns, preferably greater than 50 microns. Best results are obtained when the polymer particles are much larger for instance at least 100 microns, for instance at least 90% above 200 microns. Preferably the polymer particles may have particle sizes of up to 2.5 mm, for instance up to 2 mm. Generally the polymer particles will have particle sizes in the range 500 microns to 1 mm or 1.5 mm. In this preferred aspect of the invention the polymer particles may be added as a powder, which has been formed by solution polymerisation or a beads that have been formed by suspension polymerisation.

The polymer particles are combined directly with the material in any appropriate manner using conventional dosing equipment. For instance when the particles exist as a dispersion in a suitable liquid (aqueous or reverse phase), the dispersion may be dosed directly into the material which is being pumped through a conduit. When the polymer particles are in the form of a free flowing particles, they may be fed from a hopper by means of a screw feeder and mixed directly with material flowing through a conduit. The polymeric particles may also be fed into the material by means of an air current. In some situations wherein the material is being flowed through a conduit under high pressure it may be necessary to force the dry polymeric particles directly into the material by some suitable means. This may be for instance be a high pressure pump, for instance a screw feeder or a progressive cavity pump. In some cases the polymeric particles are fed into the material by means of a high pressure pump in combination with air blowing.

We have found that particularly good results are obtained when the water soluble polymer particles are rapidly distributed throughout the material. This can be achieved by combining the polymeric particles with a particulate diluent. Typically the polymeric particles would be mixed with the diluent so that the polymeric particles are distributed throughout the diluent. Desirably the diluent may be sodium chloride or alternatively sucrose. Suitably the ratio of polymer to diluent may be in the range 10:90 to 90:10.

In a preferred form of the invention the particles are mixed rapidly with the material, it order to reduce the likelihood of the polymer particles being unevenly distributed throughout the material, for instance stratification of the polymer particles. The mixing of the polymer particles may be achieved by use of an in-line mixer or preferably by diverting a proportion of the material into a mixing device where polymer particles (e.g. powder grade, emulsion or dispersion) is mixed thoroughly with the material and then the treated material returned to the main flow line.

In one preferred form of the invention the solid grade polymer particles are combined with the material by use of a novel polymer application equipment. In this aspect material (to be treated) flowing through a conduit is fed into a mixing chamber. Polymer particles are also fed into the mixing chamber and mixed with the material. Desirably the polymer particles are fed from a suitable storage container, such as a hopper, by means of a screw feeder. Preferably the mixing chamber has a circular wall with a larger radius at the top than the bottom. More preferably the chamber is conical shaped. The material and polymer particles are fed into the chamber at such a rate that allows the polymer particles to be distributed throughout the material. In a still more preferred form the material is fed into the conical mixing chamber at such a rate as to create a vortex into which the free flowing polymer particles are poured, thus enabling the material and polymer particles to be thoroughly mixed together. The treated material should be removed from the mixing chamber by suitable means, for instance a helical rotor pump. Desirably only a portion of the material (to be treated) is diverted into the mixing chamber, where it is combined with the polymer particles and then fed back into the main conduit conveying the material. Preferably the proportion of material diverted into the mixing chamber is less than 50%, more preferably around 5 to 20%, especially 10%.

It is surprising that the process according to the invention forms a product which rigidifies far better than alternative treatments, for instance the use of water swellable, water swellable polymers or pre-formed solutions of water soluble polymers. It is also surprising that especially good results are obtained by employing solid grade particulate polymers, comprising solid grade polymer, comprising individual large sized polymer particles as described herein. The process of the invention more effectively minimises the area taken up by a stack of the material of given volume. This is achieved whilst maintaining the pumpability of the material.

The characteristics of the re-structured mud is a significant aspect of the present invention. After addition of the water soluble polymer, energy caused by pumping, mixing or friction in the transport pipe causes the mixture to rigidify to a maximum and gradually become less rigid. In a preferred embodiment, the slurry mixture has a yield stress of less than 200 Pa, preferably less than 150 Pa and more preferably from 20 to 120 Pa, to enable satisfactory pumping. One advantage of additions in powder form is that the viscosity does not increase or diminish as rapidly as a solution-based addition.

Another surprising feature of the present invention is that once the material has been transferred to the preferred location and left to stand the aqueous liquid is released from the rigidifying material. The release of the aqueous liquor from the material is advantageous in that the mud stack has an actual higher solids and does not contain high levels of trapped liquor as in the case of the water swellable water insoluble polymer. This provides the advantages that the stacked material is not likely to destabilise and also the liquor that has been released can be recycled, for instance to extract any residual values. The case of red mud produced from the Bayer alumina process, the released liquor may be returned back to the Bayer Process (e.g. washing, thickening or digestion stages) in order to make use of the alkaline content and also any residual traces of aluminate.

In the invention the material is pumped to an outlet, where it is allowed to flow over the surface of previously rigidified material, wherein the material is allowed to stand and rigidify to form a stack. As this process is repeated multiple layers of rigidified material are built up as a stack. Thus in the present invention we also provide a product, which is preferably in the form of a stack, produced by the process of the invention, especially in any of the specifically recited forms.

In a further aspect of the invention we claim an apparatus for treating a suspension of particulate material with a solid particulate treatment chemical, comprising
  a means for extracting the suspension from a flow line, and a mixing chamber,
  comprising,
    a circular wall,
    an opening at the top and at the base in which the radius of the top is greater than the radius of the base,
  a means for delivering the particulate treatment chemical into the mixing chamber and
  a means for conveying the treated suspension from the mixing chamber.

The means for delivering the particulate treatment chemical into the mixing chamber may be a suitable feeding mechanism or by blowing the particles using a current of gas e.g. air. Preferably the means for delivering the particulate treatment chemical into the mixing chamber, includes a screw feeder. Preferably the apparatus includes a mechanical means feeding the treated suspension from the mixing chamber. This may be any suitable pump but preferably includes a helical rotor pump.

Figure 2:
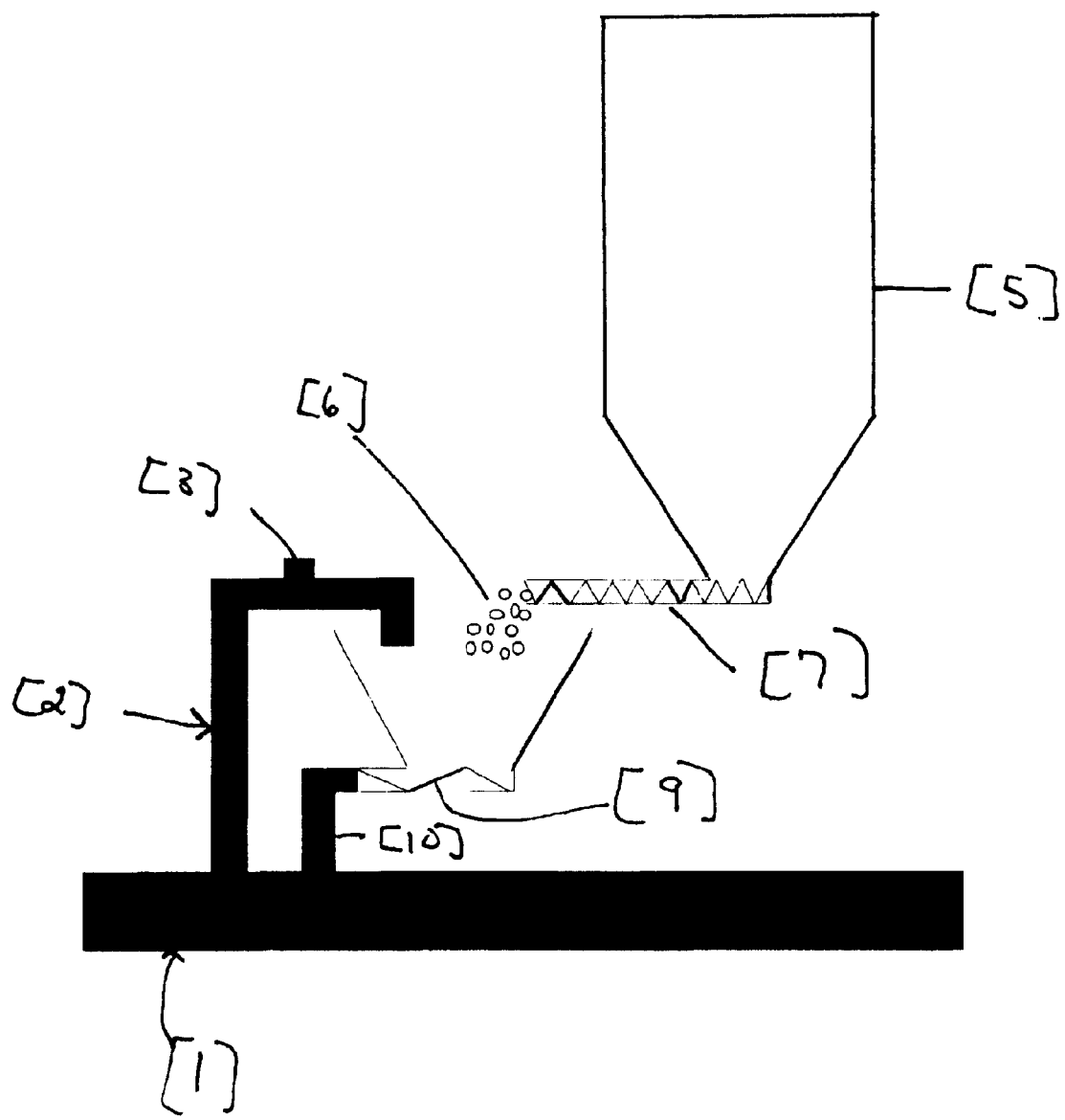
FIG. 2 is a schematic of an apparatus for treating the suspension.—has been inserted.

A schematic of a preferred form of the novel apparatus is shown in FIG. 2 for which the following key applies.
[1] Conduit for conveying material
[2] Material diversion conduit
[3] Flow control pump
[4] Mixing chamber
[5] Polymer container
[6] Polymer particles
[7] Screw feeder
[8] Helical rotor pump
[9] Return conduit In the schematic material, such as red mud, is conveyed along conduit [1]. A proportion of the material is diverted via material diversion conduit [2] into a mixing chamber [4]. A flow control valve [3] controls the flow of material into the mixing chamber. Polymer particles [6] held in polymer container [5] are fed by means of screw feed pump [7] into the mixing chamber. The polymer particles and material are thoroughly mixed together and then pumped from the base of the mixing chamber by means of a helical rotor pump [9] and then returned through the return conduit [10] to the conduit [1].

In a preferred form of the invention a suspension is treated by a particulate treatment chemical. The suspension may be any suitable suspension comprising dispersed particles in a liquid, for instance any material according to the first aspect of the invention. Preferably the suspension is an aqueous suspension of mineral particles of at least 15% solids, for instance 20 to 80% solids. More preferably the suspension is a red mud resulting from the Bayer alumina process. Thus we provide a process in which a suspension is treated by mixing with a particulate treatment chemical, comprising, flowing the suspension along a flow line taking a portion of the suspension a flowing it into a mixing chamber, where it is combined with the particulate treatment chemical and then returned to the flow line, characterised in that the suspension enters the mixing chamber and forms a vortex into which the particulate treatment chemical is fed.

The process according to this aspect of the invention overcomes the difficulties in mixing particulate treatment chemicals directly into a suspension to be treated. This process is particularly advantageous for high solids and or high viscosity suspensions where providing an even distribution of particulate treatment chemical throughout the suspension would otherwise be difficult to achieve.

The process is application to mixing any suitable particulate treatment chemical into a highly viscous substrate. Preferably the treatment chemical comprises a water soluble polymer, for instance as defined in the first aspect of the invention. The treatment chemicals preferably has a particle size of at least 20 microns, preferably at least 50 microns. The following examples serve to illustrate the invention.

EXAMPLE 1

1000 ml samples of red mud underflow from the last washer stage in a Bayer alumina process are obtained prior to the centrifugation stage. The mud solids are 28.66%. A solid powder grade water-soluble copolymer of acrylamide with sodium acrylate, of high intrinsic viscosity (about 10 dl/g) is applied to the samples of red mud at various doses levels. The treated mud is gently agitated in a lab tumbler for one hour in order to simulate the normal residence time required for the red mud to flow through the pipeline to the disposal site. The samples of treated mud are then poured onto a level surface to form a slump. This is meant to simulate the ability of the mud to form stacks. The slump diameter, slump height at the centre of the slump, slump height at the edge, mud slope and mud viscosity were measured and the results are shown in table 1.

TABLE 1

| Polymer Dose grams polymer/ tonne mud | Slump Diameter (mm) | Slump Height Centre (mm) | Slump Height Edge (mm) | Mud Slope (%) | Mud Viscosity (cP) |
| --- | --- | --- | --- | --- | --- |
| 0   | 205 | 7  | 4   | 2.92 | 142.8 |
| 50  | 190 | 8  | 4.5 | 3.68 | 142.6 |
| 100 | 182 | 9  | 5   | 4.39 | 147.1 |
| 200 | 165 | 10 | 6   | 4.85 | 160.5 |
| 300 | 160 | 11 | 6   | 6.25 | 169.4 |
| 400 | 155 | 11 | 6   | 6.45 | 173.4 |

This testwork shows confirms effective overall results even at relatively low doses. For instance at a dose of 100 grams per tonne achieves a slump angle of above 3°. It should also be noted that the high slump angle is achieved without any significant increase in the viscosity of the mud.

EXAMPLE 2

The test procedure of example 1 is repeated using 1000 ml samples of 35% w/w Australian Red Mud slurry at 10 g/l NaOH and conditioned for various lengtrhs of time using a Gate stirrer at 200 rpm and using a constant dose of 18 ppm for each of a solid grade (particle size about 1 mm) water-soluble copolymer of acrylamide with sodium acrylate of high intrinsic viscosity (about 10 dl/g) and a reverse phase polymer in oil dispersion of a water-soluble copolymer of acrylamide with sodium acrylate of high intrinsic viscosity (about 10 dl/g) having an average particle size of 750 nanometers. various conditioning times. The slump angle is measured for each conditioning time, for both liquid dispersion and solid grade polymer.

The results are shown in Table 2

TABLE 2

| Conditioning Time (mins) | Slump Angle using the dispersion in oil polymer (%) | Slump Angle using the solid grade polymer (%) |
| --- | --- | --- |
| 0  | 3  | 3  |
| 1  | 9  | 4  |
| 2  | 15 | 17 |
| 3  | 15 | 19 |
| 5  | 15 | 13 |
| 10 | 7  | 8  |
| 15 | 6  | 7  |
| 20 | 5  | 5  |
| 30 | 4  | 4  |

Figure 1:
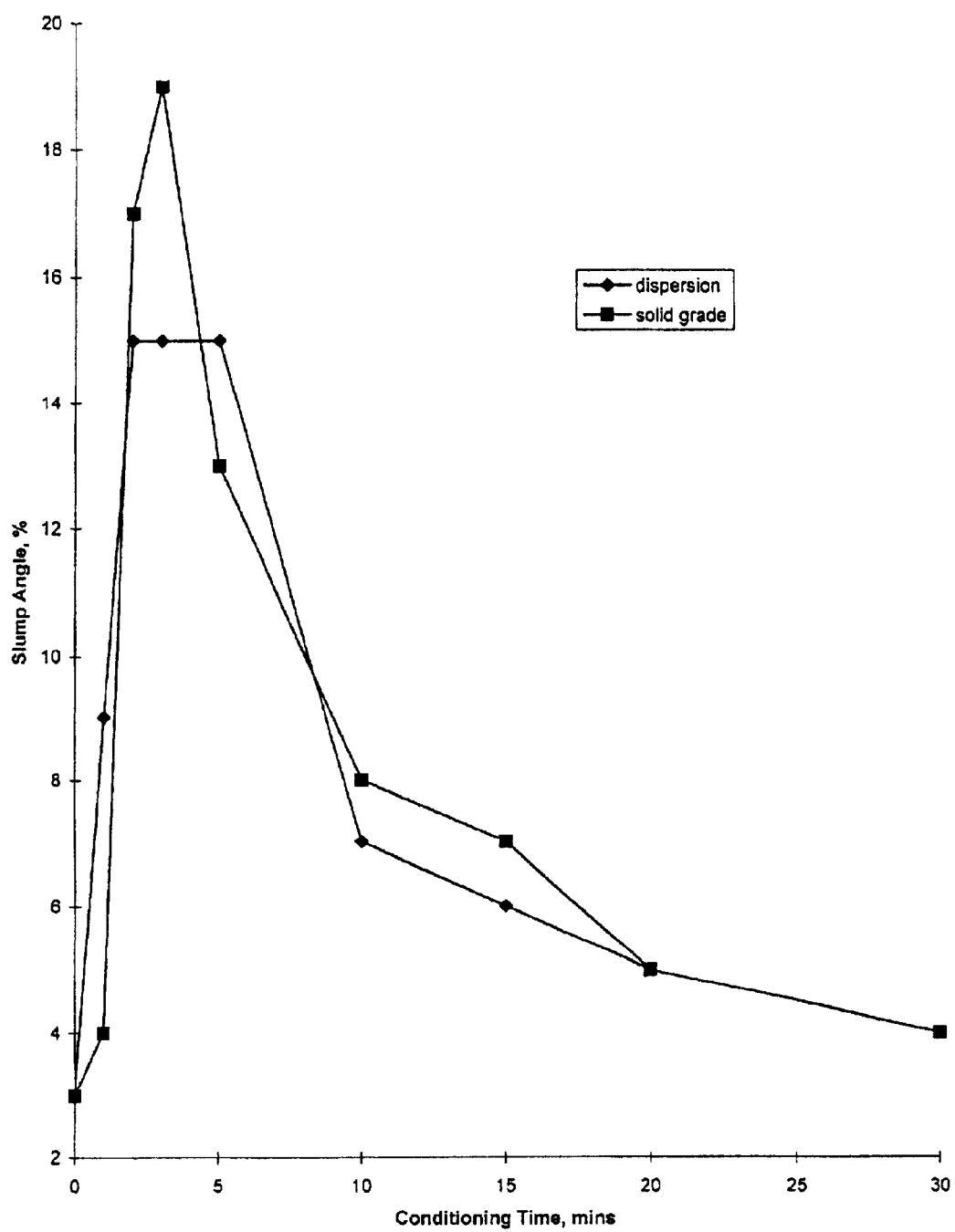
FIG. 1 is a plot of the results shown in Table 2.

The results are plotted in FIG. 1.

It can clearly be seen that both the water soluble polymer particles in oil dispersion and solid grade water soluble polymer particles both provide effective results. It can also be seen that the solid grade results give far superior results.

EXAMPLE 3

The procedure of Example 1 is repeated using various doses of the solid powder grade water-soluble copolymer of acrylamide with sodium acrylate, of high intrinsic viscosity (Product A) is applied to 1000 ml samples of red mud (30.09% solids) at various doses levels and as a comparative test using a particulate water insoluble, water swellable absorbent (Product B). Yield stress of the slump, slump angle, slump diameter, edge slump height and centre slump height were measured and the results are shown in Table 3.

TABLE 3

| Product | Dose grams/tonne | Yield Stress. | Slump Angle (%) | Slump diameter (mm) | Slump Height- Edge (mm) | Slump Height- Centre (mm) |
| --- | --- | --- | --- | --- | --- | --- |
| Control | 0   | 12.9 | 2.5 | 200 | 4.5 | 7 |
| A | 40  | 13.5 | 3.5 | 200 | 4.5 | 8 |
| A | 80  | 13.4 | 3.7 | 190 | 4.5 | 8 |
| A | 120 | 14.2 | 3.6 | 195 | 4.5 | 8 |
| A | 200 | 14.5 | 2.9 | 170 | 5.5 | 8 |
| A | 300 | 14.4 | 3.4 | 175 | 5   | 8 |

TABLE 3-continued

| Product | Dose grams/tonne | Yield Stress. | Slump Angle (%) | Slump diameter (mm) | Slump Height-Edge (mm) | Slump Height-Centre (mm) |
|---|---|---|---|---|---|---|
| B | 3800 | 16.8 | 3.3 | 180 | 5.5 | 8.5 |
| B | 1900 | 14.8 | 3.7 | 190 | 5 | 8.5 |

The results demonstrate that effective slump angles of at least 3% can be achieved using only modest doses (40 g/l) of water soluble powdered polymer by comparison to the required high doses (1900 g/t) of absorbent.

EXAMPLE 4

Polymer A of in Example 3 was dispersed into an a 39% by weight solution of calcium chloride as an aqueous dispersing medium. The polymer particles did not hydrate whilst in the dispersion. The aqueous dispersion of Polymer A was found to perform equally to the particulate form.

What is claimed is:

1. A process in which material comprising an aqueous liquid with dispersed particulate solids is pumped as a fluid then allowed to stand and rigidify to form a stack of a rigidifying aqueous material, wherein the aqueous liquid is released from the rigidifying aqueous material, and the rigidification is improved whilst retaining the pumpability of the material by combining polymeric particles with the material during or prior to pumping the material, wherein the polymeric particles are added as solid grade polymer particles and comprise water soluble polymer which has an intrinsic viscosity of at least 3 dl/g and the material has a solids content in the range of 15% to 80% by weight.

2. A process according to claim 1 in which the water soluble polymer is anionic and is formed from ethylenically unsaturated water-soluble monomer or blend of monomers comprising, (a) anionic monomers selected from ethylenically unsaturated carboxylic acid and/or sulphonic acid monomers, and optionally (b) nonionic comonomers.

3. A process according to claim 1 in which the polymeric particles have an average particles size of less than 10 microns.

4. A process according to claim 1 in which solid polymeric agglomerates or aggregates are added to the material as substantially individual particles of particle size greater than 20 microns.

5. A process according to claim 1 in which the dispersed particulate solids of the material are mineral.

6. A process according to claim 1 in which the dispersed particulate solids of the material have particle sizes less than 100 microns.

7. A process according to claim 1 in which the material comprises red mud from the Bayer alumina process.

8. A process according to claim 1 in which the material is pumped to an outlet, where it is allowed to flow over the surface of previously rigidified material, wherein the material is allowed to stand and rigidify to form a stack.

9. A process according to claim 1 in which a suspension is treated by mixing with a solid grade polymer particles, comprising, flowing the suspension along a flow line taking a portion of the suspension and flowing it into a mixing chamber, where it is combined with the particles and then returned to the flow line, characterised in that the suspension enters the mixing chamber and forms a vortex into which the particulate treatment chemical is fed.

10. A process according to claim 9 in which the particles have a particle size of at least 20 microns.

* * * * *